United States Patent [19]  [11] 3,945,972
Sakamoto  [45] Mar. 23, 1976

[54] CURABLE EPOXY RESIN COMPOSITION COMPRISING AN EPOXY RESIN AND A REACTIVE DILUENT

[75] Inventor: Kazuhiko Sakamoto, Suita, Japan

[73] Assignees: Nitto Kasei Co. Ltd.; Osaka Soda Co. Ltd., both of Osaka, Japan

[22] Filed: Oct. 7, 1974

[21] Appl. No.: 512,977

[30] Foreign Application Priority Data
- Oct. 9, 1973 Japan............................ 48-113471
- Oct. 15, 1973 Japan............................ 48-115427
- Oct. 26, 1973 Japan............................ 48-120916

[52] U.S. Cl........ 260/47 EP; 260/2 EP; 260/59 EP; 260/78.4 EP
[51] Int. Cl.$^2$......................................... C08G 30/04
[58] Field of Search....... 260/30.4 EP, 2 BP, 348 R, 260/47 EP, 59, 47.4 EP, 2 EP, 18 PF

[56] References Cited
UNITED STATES PATENTS
3,023,224  2/1962  Meyer et al..................... 260/348 X FOREIGN PATENTS OR APPLICATIONS
15,432  4/1971  Japan........................................ 260/2
1,383,358  11/1964  France Primary Examiner—Donald E. Czaja
Assistant Examiner—T. Pertilla
Attorney, Agent, or Firm—Sherman & Shalloway

[57] ABSTRACT

A curable epoxy resin composition comprising an epoxy resin and a reactive diluent, at least 60% by weight of the total amount of said reactive diluent consisting of a specific etherified polyepichlohydrin monoglycidyl ether and/or etherified polymethylepichlorohydrin monoglycidyl ether. The above etherified product is prepared by addition-polymerizing 2 to 10 mols of a compound selected from the group consisting of epichlorohydrin and methylepichlorohydrin with a monohydric phenol or alcohol and treating the resulting addition polymer with an alkaline substance.

5 Claims, No Drawings

CURABLE EPOXY RESIN COMPOSITION COMPRISING AN EPOXY RESIN AND A REACTIVE DILUENT

This invention relates to a curable epoxy resin composition which has an excellent diluting effect, is not likely to generate a noxious or combustible or ignitable vapor, exhibits excellent compatibility between the epoxy resin and the curing agent, and which can give cured products having improved properties, for example reduced occurrence of thermal strain, good flexibility and markedly improved water resistance.

More specifically, the invention relates to a curable epoxy resin composition comprising an epoxy resin and a reactive diluent, at least 60% by weight of the total amount of said reactive diluent consisting of a compound expressed by the following general formula (1)

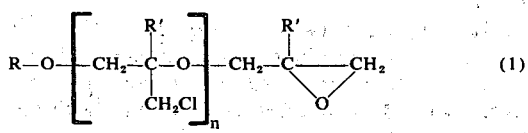

wherein R is a member selected from the group consisting of straight-chain alkyl groups containing 1 to 7 carbon atoms, branched-chain alkyl groups containing 1 to 7 carbon atoms, alkenyl groups containing 2 to 7 carbon atoms, cycloalkyl groups containing 5 to 6 carbon atoms, methyl-substituted cycloalkyl groups containing 6 to 7 carbon atoms, a phenyl group, a cresyl group and a benzyl group, R' is a hydrogen atom or a methyl group, a plurality of R' groups may be the same or different, and n is a positive integer of 1 to 9;

and to a process for preparing this epoxy resin composition.

Curable epoxy resin compositions comprising epoxy resins and reactive diluents and as optional components, curing agents, fillers, reinforcing materials, pigments or other additives have been known in the art. Known reactive diluents include, for example, glycidyl ethers of monohydric alcohols such as butyl glycidyl ether or allyl glycidyl ether, glycidyl ethers of monohydric phenols such as phenyl glycidyl ether, glycidyl ethers of polyhydric alcohols such as glycerol, butanediol, hexanediol, ethylene glycol, propylene glycol, polyethylene glycol, polypropylene glycol, trimethylol propane or neopentyl glycol, epoxide compounds such as epichlorohydrin, propylene oxide, octylene oxide or styrene oxide, epoxy compounds of amines such as glycidyl aniline, and glycidyl methacrylate. These compounds, however, are not sufficient to impart good properties as well as handling characteristics to cured articles, although they are suitable for giving certain properties to epoxy resin compositions. For example, butyl glycidyl ether, allyl glycidyl ether and phenyl glycidyl ether have good diluting effects and can improve the handling properties of epoxy resin compositions. However, their compatibility with the resins are unsatisfactory. Furthermore, they have high volatility, and low ignition points, which defects are detrimental to casting operations or result in vapors which exert adverse effects on the working personnel. On the other hand, the glycidyl ethers of polyhydric alcohols give epoxy resin cured products having poor water resistance, and their high water absorption considerably limit their end uses.

Japanese Pat. No. 19348/66 (corresponding to French Pat. No. 1,383,358) discloses an epoxy resin composition which contains as a reactive diluent a higher fatty acid glycidyl ether of the following formula (A)

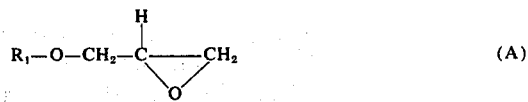

wherein $R_1$ is a straight-chain or branched-chain aliphatic group (alkyl group and alkylene group) containing 8 to 24 carbon atoms, such as octyl glycidyl ether, octylene glycidyl ether, decyl glycidyl ether, 2-dodecylene glycidyl ether or octadecyl glycidyl ether. In this prior art, the formula (A) above is a basic formula, and in the synthesis of the compounds of formula (A), dimers or trimers of the higher fatty acid glycidyl ethers that can be expressed by the following formula (A') also occur as by-products.

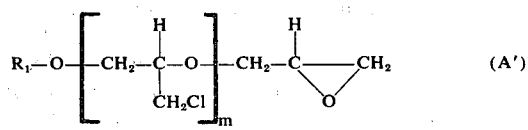

wherein $R_1$ is the same as defined above, and m is 1 or 2.

Thus, the above patent discloses that not only the higher fatty acid glycidyl ethers or formula (A) alone, but also mixtures of them with the dimers or trimers of formula (A') can be used. However, the patent discloses no actual example of using such mixtures. Furthermore, the patent does not disclose or suggest the use of these by-product dimers or trimers either alone or as an admixture which contains them in a major amount far exceeding their amount as by-products. The patent only states that a mixture of the glycidyl ethers of formula (A) with the by-product dimers or trimers as obtained can be used, and does not at all disclose or suggest that the use of such a mixture would bring about any improving effect as compared with the use of the higher fatty acid glycidyl ether of formula (A) alone.

The above-suggested reactive diluents have the advantage of low volatility and reduced occurrence of thermal stress at the time of curing. However, they exhibit unsatisfactory compatibility with resins, and curing agents, etc., and frequently render the resulting resin composition cloudy or become separated from it to cause problems with regard to processability and uniformity in reactivity and obtaining cured products.

Extensive work has been done by the inventors of the present invention with a view to providing curable epoxy resin compositions which have an excellent diluting effect, are not likely to generate a noxious or combustible or ignitable vapor, exhibit excellent compatibility between the epoxy resins and the curing agents, and which can give cured products having improved properties, such as reduced occurrence of thermal strain, good flexibility and markedly improved water resistance. As a result, they found that etherified polyepichlorohydrin monoglycidyl ethers and/or etherified polymethylepichlorohydrin monoglycidyl ethers of the above formula (1) [to be often referred to hereinbelow as monoglycidyl ether of formula (1)] can be easily prepared, and that reactive diluents containing at least 60% by weight, based on the total weight of the reactive diluents, of the monoglycidyl ether of formula (1) are extremely useful for achieving the above-described improvements.

As illustrated hereinabove, some of compounds of the formula 1 wherein $n$ is 0 have already been known as reactive diluents for epoxy resins, and therefore, the preparation of these diluents are also known (for example, U.S. Pat. No. 3,058,921). They can be prepared, for example, by subjecting epichlorohydrin and a monohydric or polyhydric alcohol to addition-reaction in the presence of an acid catalyst, for example, one containing $BF_3$ to form a chlorohydrin ether, and then cyclizing it with alkali. We have found that the monoglycidyl ethers of formula (1) can be selectively produced by subjecting 1 mol of ROH wherein R is the same as defined with respect to the formula (1) and about 2 to 10 mols of epichlorohydrin or methylepichlorohydrin to addition-reaction in the presence of an anhydrous acid catalyst, for example, one containing $BF_3$, and cyclizing the resulting addition polymer with alkali. This means that the monoglycidyl ether of formula (1) which may have been formed as a by-product in a very minor amount in the preparation of compounds of formula (1) wherein $n$ is 0 can now be obtained in a major proportion. It has also been found that the monoglycidyl ethers of the formula (1) or compounds composed mainly of these exhibit extremely good properties as compared with the conventional compounds of formula (1) wherein $n$ is 0, in respect, for example, of volatility, ignitability, compatibility, or water resistance.

Accordingly, it is an object of this invention to provide a curable epoxy resin composition which has an excellent diluting effect, is not likely to generate a noxious or combustible or ignitable vapor, exhibits excellent compatibility between the epoxy resin and the curing agent, and which can give cured products having improved properties, for example, reduced occurrence of thermal strain, good flexibility and markedly improved water resistance; and also a process for preparing this curable epoxy resin composition.

Other objects of this invention along with its advantages will become apparent from the following description.

The reactive diluent used in the composition of this invention is a compound expressed by the following formula

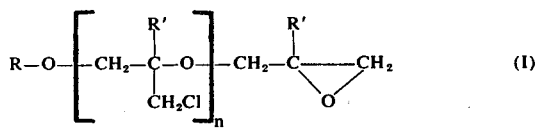

wherein R is a member selected from the group consisting of straight-chain alkyl groups containing 1 to 7 carbon atoms, branched-chain alkyl groups containing 1 to 7 carbon atoms, preferably alkyl groups having 1 to 5 carbon atoms, alkenyl groups containing 2 to 7 carbon atoms, preferably an alkenyl group containing 3 carbon atoms, cycloalkyl groups containing 5 to 6 carbon atoms, methylsubstituted cycloalkyl groups containing 6 to 7 carbon atoms, a phenyl group, a cresyl group and a benzyl group, R' is a hydrogen atom or a methyl group, a plurality of R' groups being the same or different, and $n$ is a positive integer of 1 to 9.

The above compounds account for at least 60% by weight, preferably at least 70% by weight, more preferably at least 80% by weight, and especially preferably at least 90% by weight, of the total amount of reactive diluent to be incorporated into the epoxy resin.

Examples of the $C_1$ to $C_7$ alkyl groups that may be branched are methyl, ethyl, n-propyl, i-propyl, n-butyl, i-butyl, sec-butyl, tu-butyl, n-amyl, i-amyl, sec-amyl, diethylcarbyl, t-amyl, n-hexyl, methylamyl, 2-ethylbutyl, and n-heptyl. Examples of the $C_{2-7}$ alkenyl groups include allyl, propenyl, and dimethyl-2-butenyl groups. Examples of the $C_{5-7}$ cycloalkyl groups are cyclopentyl, cyclohexyl, methylcyclopentyl and methylcyclohexyl groups.

If the group R in the monoglycidyl ether of the formula (1) contains more carbon atoms than the above-specified limit, the resulting reactive diluent of the formula (1) has reduced compatibility with the epoxy resin and a curing agent therefor, making it impossible to produce the desired diluting effect.

Examples of suitable monoglycidyl ethers of formula (1) that can be used in this invention include:
methylpolyepichlorohydrin monoglycidyl ethers ($n$=1-9),
ethylpolyepichlorohydrin monoglycidyl ethers (=1-9),
n-butylpolyepichlorohydrin monoglycidyl ethers ($n$=1-9),
i-propylpolyepichlorohydrin monoglycidyl ethers ($n$=1-9),
i-butylpolyepichlorohydrin monoglycidyl ethers ($n$=1-9),
sec-butylpolyepichlorohydrin monoglycidyl ethers ($n$=1-9),
t-butylpolyepichlorohydrin monoglycidyl ethers ($n$=1-9),
n-amylpolyepichlorohydrin monoglycidyl ethers ($n$=1-9),
i-amylpolyepichlorohydrin monoglycidyl ethers ($n$=1-9),
sec-amylpolyepichlorohydrin monoglycidal ethers ($n$=1-9),
diethylcarbylpolyepichlorohydrin monoglycidyl ethers ($n$=1-9),
t-amylpolyepichlorohydrin monoglycidyl ethers ($n$=1-9),
n-hexylpolyepichlorohydrin monoglycidyl ethers ($n$=1-9),
methylamylpolyepichlorohydrin monoglycidyl ethers ($n$=1-9 ),
2-ethylbutylpolyepichlorohydrin monoglycidyl ethers ($n$=1-9),
n-heptylpolyepichlorohydrin monoglycidyl ethers ($n$=1-9),
allylpolyepichlorohydrin monoglycidyl ethers ($n$=1-9),
propenylpolyepichlorohydrin monoglycidyl ethers ($n$=1-9),
dimethyl-2-butylpolyepichlorohydrin monoglycidyl ethers ($n$=1-9),
cyclopentylpolyepichlorohydrin monoglycidyl ethers ($n$─1-9), cyclohexylpolyepichlorohydrin monoglycidyl ethers ($n=1-9$),
methylcyclohexylpolyepichlorohydrin monoglycidyl ethers ($n=1-9$),
phenylpolyepichlorohydrin monoglycidyl ethers ($n=1-9$),
m-cresylpolyepichlorohydrin monoglycidyl ethers ($n=1-9$),
p-cresylpolyepichlorohydrin monoglycidyl ethers ($n=1-9$),
benzylpolyepichlorohydrin monoglycidyl ethers ($n=1-9$), and
polymethylepichlorohydrin derivatives of the above compounds.

The monoglycidyl ethers of the formula (1) may be a mixture of the monoglycidyl ethers of different positive integers $n$. The reactive diluent may contain another known reactive diluent in an amount of not more than 40%, preferably not more than 30%, more preferably not more than 20%, and especially preferably not more than 10%, based on the total amount of the reactive diluent of formula (1).

The other known diluent may be a compound of the above formula (1) in which $n$ is 0 or a positive integer exceeding 9, or may be those expressed by different formulae from the formula (1). Or it may be a suitable mixture of these.

The monoglycidyl ether of the formula (1) used in the composition of this invention has a higher molecular weight than the conventional monoglycidyl ethers. It has one epoxy group only at one end of its molecule and a chlorine atom at the side chain of its polyether chain portion. The presence of this chlorine atom in the polyether portion increases the compatibility of the monoglycidyl ether with epoxy resins and curing agents and serves to impart water repellency to the cured product. Furthermore, since the monoglycidyl ether of formula (1) has a higher epoxy equivalent than the conventional polyglycidyl ethers, there is a tendency that the reaction between the epoxy resin and the curing agent is controlled when curing the composition in the presence of a curing agent, and as a result, the release or generation of heat caused by a curing reaction is reduced. This in turn contributes to the reduction of charring or thermal stress of the resin. Furthermore, since the monoglycidyl ether of formula (1) has low volatility, the weight loss of the resin composition at the time of curing can be reduced, and there is no danger of the generation of a noxious and/or ignitable or combustible vapor at the time of operation.

The effective dilution of an epoxy resin by adding the monoglycidyl ether of the formula (1) in accordance with this invention reduces maximum heat generation, prevents the degradation of the cured product, imparts flexibility to the cured product, brings about a better penetrability and an improvement in operability in paints, and gives rise to a better wetting ability in lamination or adhesion. In addition, the effective decrease in viscosity of the epoxy resin permits the incorporation of larger amounts of fillers, reinforcing substances or other additives while maintaining the viscosity of the epoxy resin at sufficiently low operable levels.

The amount of the monoglycidyl ether of the formula (1) in the composition of this invention can be varied properly according to the R, R', and $n$ in the formula (1), and the end use of the epoxy resin composition, etc. Generally, the amount to be incorporated is about 1 to about 150 parts by weight per 100 parts by weight of the epoxy resin. Preferably, the amount is about 5 to about 100 parts by weight per 100 parts by weight of the epoxy resin.

In addition to the epoxy resin and the reactive diluent, the composition of this invention may contain various conventional additives for curable epoxy resin compositions. Examples of such additives are fillers, reinforcing materials, pigments, colorants, curing agents, plasticizers, and fire retardants. Specific examples of the reinforcing materials and the pigments are aluminum oxide, silicon dioxide, aluminum silicate, calcium silicate, magnesium silicate, magnesium oxide, titanium oxide, magnesium silicate, iron oxide, barium sulfate, barium carbonate, calcium carbonate, magnesium carbonate, calcium sulfate, carbon, aluminum powder, zinc powder, copper powder, and glass fibers. There is no particular restriction on the amounts of these conventional additives to be used. Usually, such additives are incorporated in an amount of up to about 200 parts by weight per 100 parts by weight of the epoxy resin composition.

Examples of the curing agents includes polyamines such as diethylene triamine, triethylene tetramine, tetraethylene pentamine, diethylaminopropylamine, bis-aminopropylaminotetraoxaspiroundecane, piperidine, N-aminoethyl piperazine, phenylene diamine, diaminodiphenylmethane, diaminodiphenyl sulfone, xylylene diamine, benzyl dimethylamine, tris-dimethylaminomethyl phenol, 2-ethyl-4-methyl imidazole or methyl imidazole, polyamine adducts obtained by adding an epoxy compound such as ethylene, oxide, propylene oxide, butyl glycidyl ether, phenyl glycidyl ether, and an aliphatic carboxylic acid glycidyl ester, epoxy resins or acrylonitrile, and polyaminepolyamides obtained by the addition reaction of some of the active hydrogens of the above polyamines with carboxylic acids such as dimeric acid. There can also be used, for example, carboxylic anhydrides such as maleic anhydride, pthalic anhydride, trimellitic anhydride, benzophenone tetracarboxylic anhydride, hexahydro- or tetrahydrophthalic anhydride, methylnagic anhydride, chlorendic anhydride or polyazelaic anhydride, $BF_3$ complex compounds such as $BF_3$-monoethanolamine or $BF_3$-piperidine complexes, dicyandimide, polysulfide resins, phenol resins, alkyd resins, and melamine resins.

Generally, the curing agent is used in an amount of 50 to 150% of the stoichiometrical amount, but it is sufficient that the tertiary amines and $BF_3$ complexes are used in catalytic amounts. Usually, these curing agents are used in an amount of about 0.5 to about 150 parts per 100 parts by weight of the epoxy resin composition at room temperature or at an elevated temperature ranging from 50° to 200°C.

Examples of the plasticizers are coal tar, pine oil, white tar, mobilsol, dibutyl phthalate, and tricresyl phosphate. The amount of the plasticizer is usually up to about 200% by weight per 100 parts by weight of the epoxy resin composition.

Examples of the fire retardants are antimony trioxide, tris-chloroethyl) phosphate, tris(cyclopropyl) phosphate, and tris(dibromopropyl) phosphate. Usually, the amount of the fire retardant is up to about 50 parts per 100 parts by weight of the epoxy resin composition.

There is no particular restriction on the epoxy resin used in the composition of this invention, but a wide range of epoxy resins containing at least two epoxy groups in the molecule can be used. The epoxy resins are well known, and we shall cite only some examples below.

Bisphenol A.glycidyl ether type epoxy resins (generally having a molecular weight of about 300–7,000) derived from bisphenol A and epichlorohydrin expressed by the following formula

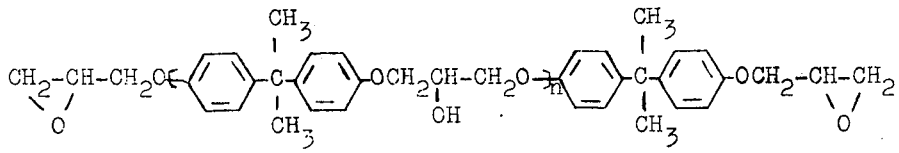

Phenol novolac polyglycidyl ether type epoxy resins of the following formula brominated bisphenol A.diglycidyl ether type epoxy resins of the following formula

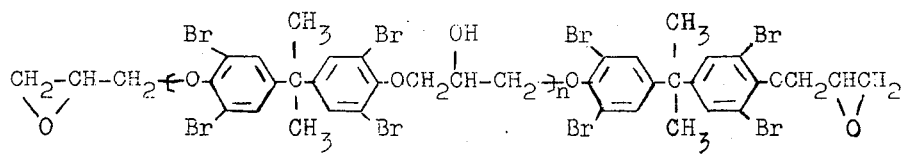

hydrogenated bisphenol A.diglycidyl ether type epoxy resins of the following formula

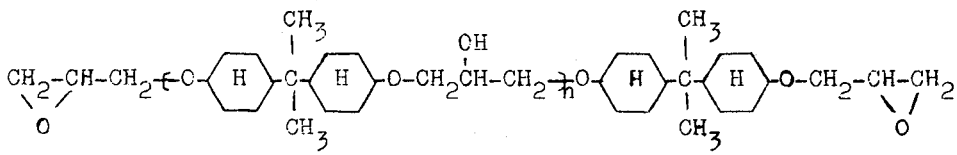

diglycidyl ether type epoxy resins derived from alkylene oxide-added bisphenol A and epichlorohydrin and containing an alkylene ether (for example, propylene ether) in the side chain, which are expressed by the following formula

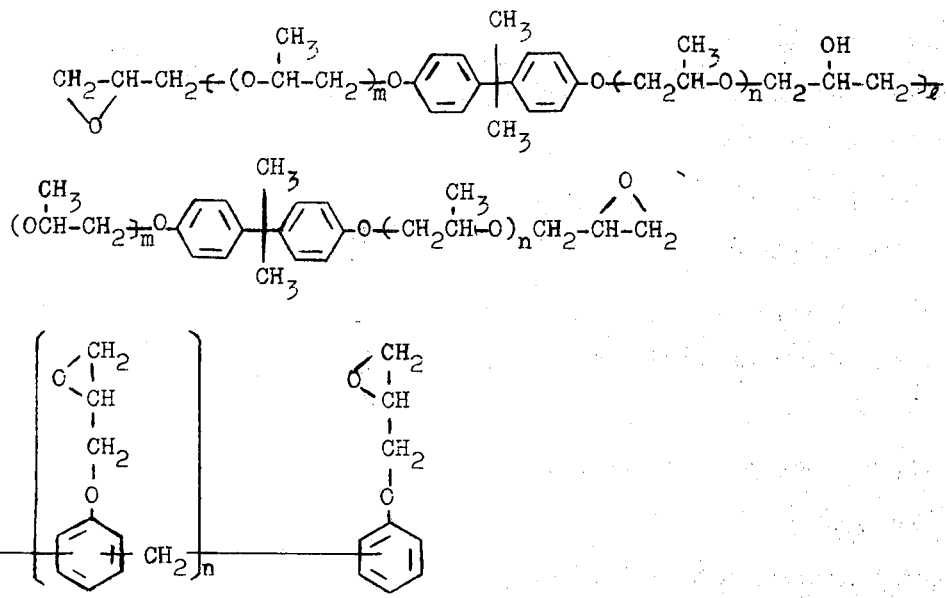

cresol novolac polyglycidyl ether type epoxy resins of the following formula ether type epoxy resins such as resorcinol.diglycidyl ether type epoxy resins expressed by the formula

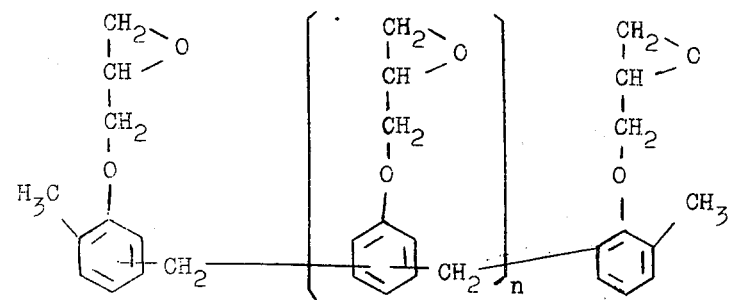

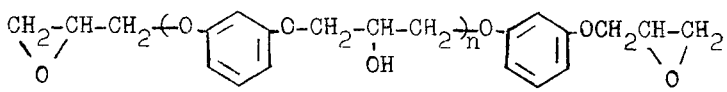

phthalic acid diglycidyl ester type epoxy resins derived from phthalic acid and epichlorohydrin expressed by the general formula

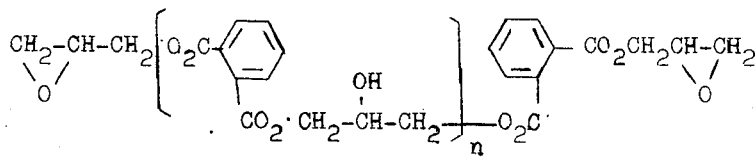

and bisphenol A.methylepichlorohydrin type epoxy resins derived from bisphenol A and methylepichlorohydrin expressed by the general formula

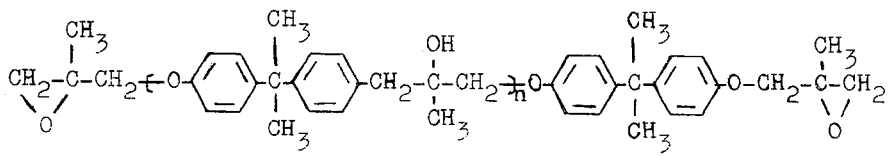

wherein $n$ is 0 to 10.

The monoglycidyl ether of formula (1) to be used in this invention as a reactive diluent can be easily prepared by addition-polymerizing a monohydric alcohol or phenol of the following formula (2)

$$ROH \tag{2}$$

wherein R is a member selected from the group consisting of straight-chain alkyl groups containing 1 to 7 carbon atoms, branched-chain alkyl groups containing 1 to 7 carbon atoms, alkenyl groups containing 2 to 7 carbon atoms, cycloalkyl groups containing 5 or 6 carbon atoms, methyl-substituted cycloalkyl groups containing 6 or 7 carbon atoms, a phenyl group, a cresyl group, and a benzyl group, with about 2 to about 10 mols of epichlorohydrin and/or methylepichlorohydrin in the presence, as a catalyst, of an anhydrous acid catalyst, and treating the addition polymer with an alkaline substance.

Specific examples of the compound of formula (2) above are monohydric alcohols such as methyl alcohol, ethyl alcohol, propyl alcohol, butyl alcohol, pentyl alcohol, hexyl alcohol, heptyl alcohol, cyclohexyl alcohol, methylcyclohexyl alcohol, benzyl alcohol and allyl alcohol, and monohydric phenols such as phenol or cresols.

The acid catalyst used in the above reaction may, for example, be a complex salt of boron trifluoride, or tin tetrachloride. The amount of the catalyst used can be properly chosen, and for example, it is about 0.001 to about 0.1 mol, preferably about 0.03 to about 0.005 mol per mol of the compound of the formula (2).

The addition polymerization is carried out by contacting the monohydric alcohol and/or phenol of the formula (2) with the epichlorohydrin and/or methylepichlorohydrin in the presence of the anhydrous acid catalyst in the presence or absence of a solvent. Preferably, the reaction is carried out at elevated temperatures, but it can also be performed at room temperature. Usually, the reaction temperature employed in this invention is not more than 150°C., for example, about 30° to about 110°C.

The solvent used for the above reaction includes, for example, halogenated hydrocarbons such as methylene chloride, ethylene dichloride, chloroform, methylchloroform and carbon tetrachloride, ethers such as diethyl ether and diisopropyl ether, aliphatic hydrocarbons such as cyclohexane or n-hexane, and aromatic hydrocarbons such as benzene or toluene.

In the above-described polymerization reaction for preparing the monoglycidyl ether reactive diluent of formula (1), the epichlorohydrin and/or methylepichlorohydrin is polymerized in an amount of about 2 to about 10 mols per mol of the monohydric alcohol or phenol. If the amount of the former exceeds about 10 mols, the compound of formula (1) cannot be prepared selectively. Amounts less than about 2 mols are undesirable since the use of such minor amounts tend to cause the starting alcohol to remain unreacted and may result in side-reactions with the resulting product.

The degree of polymerization of the monoglycidyl ether can be varied by changing the molar proportion of the epichlorohydrin and/or methylepichlorohydrin within the abovespecified range, whereby it is possible to obtain etherified polyether epichlorohydrin or etherified polyether methylepichhlorohydrin polymer corresponding to the compound of formula (1) wherein $n$ is any desired integer within the range of 1 to 9, almost quantitatively and selectively.

By treating the resulting etherified polyether epichlorohydrin or etherified polyether methylepichlorohydrin polymer with an alkaline substance in the presence or absence of a solvent, the corresponding etherified polyepichlorohydrin monoglycidyl ether or etherified polymethylepichlorohydrin monoglycidyl ether of the formula (1) can be easily obtained.

Examples of preferred alkaline substances used in this cyclization reaction are hydroxides, carbonates, or bicarbonates of alkali metals, such as sodium hydroxide, potassium hydroxide, sodium carbonate, potassium carbonate, sodium bicarbonate, and potassium bicarbonate. Other alkaline substances, such as calcium hydroxide, barium hydroxide, iron hydroxide, aluminum hydroxide, oxides of the metals in these compounds, and sodium aluminate, can also be used.

The reaction can be performed at a temperature of 25° to 70°C., preferably 35° to 55°C. Where a solvent is used, those solvents which can be used in the above addition-polymerization reaction can be utilized. The monoglycidyl ether polymers of formula (1) obtained in accordance with this invention are liquids of relatively low molecular weight which are easily soluble in organic solvents in general.

The curable epoxy resin composition of this invention can be used in a wide variety of applications, such as paints, adhesives, laminating material, embedding material, casting material, molding material, floor material, anti-corrosive linings, or construction and building materials.

The following Examples and Comparative Examples further illustrate the present invention.

In the following examples, the diluting effects, ignitability, volatility, water resistance, exothermic property, hardness and compatibility were those determined by the following test methods.

1. Diluting effect 450 g of a mixture consisting of an epoxy resin (Epikote 828, a bisphenol A type diglycidyl ether having an epoxy equivalent of 190, a product of Shell Kagaku Kabushiki Kaisha) and 25 or 50% by weight, based on the entire mixture, of a reactive diluent is placed in a broad-mouthed glass bottle having a capacity of 500 cc, and the glass bottle is placed in a constant temperature vessel kept at 25°C. When the mixture has attained the constant temperature of 25°C., the viscosity of the mixture is measured using a BM type viscometer, and the viscosity value is expressed by poises at 25°C. smaller figures show higher diluting effects. The viscosity of the epoxy resin (Epikote 828) used here is 121 poises/25°C.

2. Ignitability

The ignition point (°C.) of a reactive diluent is measured in accordance with the methods stipulated in Japanese Industrial Standards (designation, JIS K 2803-68 and JIS K 2810-68). For samples having an ignition point of not more than 80°C., the latter method is used, and for other samples, the former method is used. Those having an ignition point of not more than 80°C. are undesirable from the viewpoint of fire prevention during handling of the epoxy resin composition and the curing operation.

3. VOLATILITY 5 g of a reactive diluent is placed in a Petri dish having an inside diameter of 65 mm and a depth of 8 mm and made of tin plate. The Petri dish is allowed to stand in an air bath kept constantly at 100°C. One hour later, the Petri dish is withdrawn from the bath, and immediately, accommodated in a desiccator. The temperature is decreased to room temperature, and the amount of the reactive diluent lost is measured. The volatility is expressed by percentage (weight) of the loss based on the initial amount (5 g) of the diluent. Larger Figures show higher volatility, and thus are undesirable from the viewpoint of operational safety and the properties of the resulting product.

4. WATER RESISTANCE

This will be specifically described with regard to Example 1 shown in Table 2. The same method will be followed in other Examples.

a. Water resistance A

This refers to a cured product cured with a polyamine-type curing agent.

395 g of a curing agent (EPOMATE B002, tradename for a butyl glycidyl ether adduct of bis-aminopropylaminotetraoxospiroundecane having an active hydrogen equivalent of 95, a product of Ajinomoto Kabushiki Kaisha) is incorporated in a uniform mixture of 50 g of EPIKOTE 828 (an epoxy resin) and 50 g of the reactive diluent (Preparation Example No. 1) to form a sample composition. The sample composition is cast into a circle plate, and cured to form a cast cured product having a diameter of 57 mm and a thickness of 3 mm. The curing is effected for 4 days at room temperature, and then for 24 hours at 80°C. The resulting cured product is immersed for 1 day in a water bath at 70°C. and for 30 days in a water bath at room temperature. Then, it is withdrawn from the bath, the adhering water is wiped off, and the weight of the cured product is measured. The difference (amount of water absorption) between the weight of the cured product before the immersion treatment and that after the treatment is measured, and the the weight of water absorbed is expressed by weight percent based on the weight of the cured product before the treatment (water absorption).

b. Water Resistance B

This test refers to Example 2 shown in Table 2, and shows resistance to saline solution.

50 g of EPIKOTE 834 (a bisphenol type diglycidyl ether having an epoxy equivalent of 250) is well mixed with 50 g of the reactive diluent (Preparation Example No. 2), and then 30.5 g of EPOMATE B002 as a curing agent is added. Then, the entire mixture is well stirred, and thoroughly defoamed. The resulting mixture is coated to a thickness of about 0.2 mm on a cold rolled steel plate (JIS G3141) having a length of 150 mm and a width of 70 mm of which surface has been abraded with an abrasive paper No. 280, thoroughly washed with trichloroethane, and dried. The coating is allowed to cure for 4 days at room temperature and further for 24 hours at 80°C. The coated steel plate is immersed lengthwise to a depth of about a half of its length in a salt containing bath obtained by dissolving 50 g of common salt, 10 ml. of glacial acetic acid and 5 g of 30% aqueous hydrogen peroxide in 1 liter of water, and adjusting the pH of the aqueous solution to 3 with an aqueous solution of sodium hydroxide. The temperature of the bath is maintained at 60°C., and the state of the coated film is observed every 1 hour over 8 hours. Samples which do not show any appreciable change at the end of this 8-hour period are observed for their changes every day until the end of one week starting at the end of 24 hours. The results of observation are evaluated on a scale of grade 1 to grade 10 as follows:

Grade 1 (excellent):
   No appreciable change at the end of 8 hours
Grade 2 (very good):
   No appreciable change at the end of 2 days; during the period from the 4th to the 7th day, slight swelling occurs partly Grade 3 (good):
  No appreciable change at the end of 24 hours, but at the end of two days, the occurrence of swelling is observed
Grade 4:
  No appreciable change at the end of 8 hours, but swelling occurs at the end of 24 hours
Grade 5:
  The coating is peeled off at the end of 8 hours
Grade 6:
  The coating is peeled off at the end of 7 hours
Grade 7:
  The coating is peeled off at the end of 6 hours
Grade 8:
  The coating is peeled off at the end of 5 hours
Grade 9:
  The coating is peeled off at the end of 4 hours
Grade 10:
  The coating is peeled off within 4 hours

5. EXOTHERMIC PROPERTY

This refers to Example 4 of Table 2. The same method will be followed in other Examples.

25 g of the reactive diluent is uniformly mixed with 75 g of EPIKOTE 828, and 10.6 g (84% of theory) of tetraethylenepentamine (active hydrogen equivalent 27.1) as a curing agent is incorporated into the mixture to form a sample composition. The sample composition is placed in a wax-coated paper cup having a capacity of 190 ml. in a test chamber conditioned to a relative humidity of 50% and a temperature of 25°C., and thoroughly stirred. Using a thermometer, the maximum temperature attained (°C.) is measured.

6. HARDNESS

This refers to Example 8 of Table 2. The same method will be followed in other Examples.

25 g of the reactive diluent is uniformly mixed with 75 g of EPIKOTE 828, and 42.6 g of EPOMATE B002 as a curing agent is incorporated into the mixture to form a sample composition. The sample composition is post-cured at 80°C. for 10 hours, and then its hardness is measured using a Barcol Impressor (ASTM D 2583-67) in a test chamber conditioned to a relative humidity of 50% and a temperature of 25°C.

7. COMPATIBILITY

The compatibility between the epoxy resin and the curing agent is one of the important factors in operability, reactivity, and the uniformity of the cured product, and the following test was conducted using a typical epoxy resin and most common polyamine and polyamide.

a. Compatibility with the epoxy resin A i. 30 g of a diluent is added to 70 g of EPIKOTE 828 at 25°C., and the mixture is stirred for 15 minutes. After allowing the mixture to stand for 30 minutes, the compatibility of the diluent with the epoxy resin is evaluated on the following scale.
  1: mutually dissolved to form a clear solution
  2: insoluble matter present to cause turbidity
  3: oil droplets separated slightly
  4: less than 1% of an oily layer separated
  5: less than 3% of an oily layer separated
  6: less than 5% of an oily layer separated
  7: more than 5% of an oily layer separated ii. The mixture obtained in (i) above is allowed to stand for 1 week at 5°C., and the compatibility is evaluated in the same way as in (i) above.

b. Compatibility with an amine curing agent B i. 10 g of triethylene pentamine is added to 200 g of a reactive diluent at 25°C., and the mixture is vigorously stirred for 5 minutes. The mixture is defoamed for 15 minutes at about 200 mmHg. The compatibility is evaluated in the same way as in (a) above.

ii. The same procedure as in (b), (i) above is repeated except that the temperature is changed to 5°C.

c. Compatibility with an amide curing agent C i. 20 g of polyamide (Versamide 125, a product of Daiichi General Kabushiki Kaisha, with an amine value of 340) is added to 30 g of a reactive diluent at 25°C., and the compatibility is evaluated in the same way as in (b), (i) above.

ii. The same procedure as in (c), (i) above is repeated except that the temperature is changed to 5°C.

EXAMPLES OF PREPARING THE REACTIVE DILUENT OF THIS INVENTION

Preparation Example 1

A reaction vessel was charged with 74.1 g of n-butyl alcohol and 1.4 g of boron trifluoride-etherate, and with good stirring, the temperature was maintained at 50° to 60°C., and 277.5 g of epichlorohydrin was added dropwise over the course of 4.5 hours. The mixture was further stirred for 1 hour at this temperature to complete an addition polymerization reaction. At this point, a part of the addition polymer was withdrawn, and analysis of it showed no presence of epichlorohydrin. 500 ml. of toluene was added to the reaction product, and the mixture was well stirred. While maintaining the temperature at 40° to 50°C., 48 g of flaky sodium hydroxide was added over the course of 1 hour. The mixture was further stirred at this temperature for 1 hour, and then cooled to about 30°C. 250 ml. of water was added, and the mixture stirred to dissolve the resulting sodium chloride. After standing, the mixture was separated into an aqueous phase and a toluene phase. The toluene phase was evaporated at reduced pressure to remove the toluene. The residue was filtered to afford 306 g of n-butylpolyepichlorohydrin monoglycidyl ether as a transparent light yellow liquid in a yield of 97%.

Preparation Examples 2 to 7, 12 and 13

Preparation Example 1 was repeated except that the type of the monohydric alcohol, the amount of epichlorohydrin, the type and amount of the catalyst, and the reaction conditions were changed as indicated in Table 1 to form monoglycidyl ethers of this invention.

Preparation Example 8

A reaction vessel was charged with 94.1 g (1 mol) of phenol, 1.5 g of boron trifluoride-etherate and 100 ml. of toluene, and with good stirring, the temperature was mainteined at 55° to 65°C., and 277.5 g (3 mols) of epichlorohydrin was added dropwise over the course of 3 hours and 20 minutes. The mixture was further stirred for 1 hour at this temperature to complete an addition polymerization reaction of these monomers. At this point, a part of the addition polymer was withdrawn, and analysis of it showed no presence of epichlorohydrin. 400 ml. of toluene was added to the reaction mixture, and the mixture stirred thoroughly. While maintaining the inside temperature of the reactor at 40° to 45°C., 67.3 g (1.2 mols) of solid sodium hydroxide was added over the course of 1 hour. The mixture was further stirred at this temperature for 1 hour, and then cooled to about 30°C. 440 ml. of water was added to remove the resulting potassium chloride. The organic layer was further washed with 150 ml. of water, and the toluene was evaporated off at reduced pressure. The residue was filtered to afford phenylpolyepichlorohydrin monoglycidyl ether as a transparent light yellow liquid.

Preparation Examples 9 to 13

Example 8 was repeated except that the type of the monohydric phenol, the amount of epichlorohydrin used, and the type and amount of the catalyst were changed as indicated in Table 1 to prepare monoglycidyl ethers of this invention.

The yield and properties of the monoglycidyl ethers obtained in these Preparation Examples 1 to 13 are shown in Table 1. For comparison, the data of known reactive diluents are also shown (Comparative Example 1 and 2).

EXAMPLES OF EPOXY RESIN COMPOSITIONS

Examples 1 to 16 and Comparative Examples 1 to 15

Epoxy resin compositions were prepared from EPIKOTE 828 or 834 (a bisphenol A.glycidyl ether type epoxy resin, a product of Shell Kagaku Kabushiki Kaisha) and the reactive diluents shown in Table 2. The various properties of the resin compositions are shown in Table 2.

The pot life shown in the table is the time (minutes) required for the same sample composition as used in the exothermic property test to gell and become solid.

The volume resistivity is measured in accordance with Japanese Industrial Standards JIS K6911 ($\Omega^{-cm}$, 120°C.) on a test piece which has been prepared by adding 90% (based on the theoretical equivalent) of methylnadic anhydride and 1.5 parts by weight of tris(-dimethylaminomethyl) phenol to a uniform mixture of 90 parts by weight of the epoxy resin and 10 parts by weight of the reactive dilvent, casting the resulting composition into a disc form having a diameter of 10 cm and a thickness of 3, mm, and curing it at 130°C. for 5 hours. Larger numerical values show better resistivity.

Table 1

| Preparation Examples Nos. | Reactants | | | | | Reaction condition | |
|---|---|---|---|---|---|---|---|
| | Amount of epichloro-hydrin (g) | ROH | | Catalyst | | Temperature (°C.) | Time (hr.) |
| | | Name | Amount (g) | Name | Amount (g) | | |
| 1 | 277.5 | Butyl alcohol | 74.1 | BF₃.etherate | 1.4 | 50 – 60 | 5.5 |
| 2 | 370.0 | " | 74.1 | " | 1.4 | 52 – 60 | 5.5 |
| 3 | 555.0 | " | 74.1 | BF₃.butyletherate | 3.5 | 45 – 60 | 6.0 |
| 4 | 277.5 | Cyclohexyl alcohol | 100.2 | SnCl₄ | 3.4 | 55 – 63 | 3.5 |
| 5 | 370.0 | " | 100.2 | BF₃.etherate | 2.0 | 54 – 65 | 4.5 |
| 6 | 370.0 | Propyl alcohol | 60.1 | SnCl₄ | 2.6 | 50 – 65 | 5.5 |
| 7 | 277.5 | Benzyl alcohol | 108.1 | BF₃.etherate | 1.8 | 56 – 70 | 4.5 |
| 8 | 277.5 | Phenol | 94.1 | " | 1.5 | 55 – 65 | 4.3 |
| 9 | 277.5 | " | 94.1 | SnCl₄ | 2.6 | 55 – 65 | 4.3 |
| 10 | 370.0 | " | 94.1 | BF₃.etherate | 2.9 | 55 – 65 | 4.3 |
| 11 | 277.5 | p-Cresol | 108.1 | " | 1.5 | 55 – 65 | 4.3 |
| 12 | 277.5 | i-Amyl alcohol | 88.0 | BF₃.butyletherate | 1.3 | 45 – 55 | 3.5 |
| 13 | 370.0 | Allyl alcohol | 58.0 | SnCl₄ | 2.2 | 45 – 55 | 4.0 |
| Comparative Example 1 | | | | | | | |
| Comparative Example 2 | | | | | | | |

| Preparation Examples Nos. | Reaction Products | | | | | |
|---|---|---|---|---|---|---|
| | Name (average value of n in formula) | Yield (%) | Epoxy equivalent | Viscosity (Centipoises, 25°C) | Ignitability (°C) | Volatility (%) |
| 1 | Butylpolyepichlorohydrin monoglycidyl ether (3) | 306 (97%) | 328 | 22 | 115 | 2.9 |
| 2 | " (4) | 400 (98%) | 412 | 66 | 162 | 0.8 |
| 3 | " (6) | 584 (99%) | 605 | 198 | 171 | 0.5 |
| 4 | Cyclohexylpolyepichlorohydrin monoglycidyl ether (3) | 334 (98%) | 350 | 67 | 152 | 1.4 |
| 5 | " (4) | 427 (98%) | 452 | 113 | 167 | 0.7 |
| 6 | Propylpolyepichlorohydrin monoglycidyl ether (4) | 378 (96%) | 388 | 54 | 134 | 1.9 |
| 7 | Benzylpolyepichlorohydrin monoglycidyl ether (3) | 342 (98%) | 367 | 104 | 160 | 0.6 |
| 8 | Phenylpolyepichlorohydrin monoglycidyl ether (3) | 322 (96%) | 463 | 513 | 175 | 0.3 |
| 9 | " (3) | 825 (97%) | 468 | 542 | 165 | 0.4 |
| 10 | " (4) | 410 (96%) | 535 | 615 | 177 | 0.2 |
| 11 | p-tolylpolyepichlorohydrin monoglycidyl ether (3) | 339 (97%) | 438 | 480 | 148 | 0.2 |
| 12 | i-Amylpolyepichlorohydrin monoglycidyl ether (3) | 277 (98%) | 346 | 55 | 161 | 0.5 |
| 13 | Allylpolyepichlorohydrin monoglycidyl ether (4) | 380 (97%) | 397 | 65 | 153 | 0.3 |
| Comparative Example 1 | Butyl glycidyl ether | | 145 | 1 | 65 | 99.3 |
| Comparative Example 2 | Phenyl glycidyl ether | | 155 | 6 | 79 | 11.0 |

Table 2

| Examples (Ex.) & Comparative Examples (Comp.) | Reaction diluents | Diluting effect | | Igni- tability (°C) | Vola- tility (%) | Water resistance | |
|---|---|---|---|---|---|---|---|
| | | Amount of the diluent in the composition (wt. %) | Poises at 25°C. | | | A (%) | B (grade) |
| Ex. 1 | n-Butylpolyepichlorohydrin monoglycidyl ether (Prep. Ex.1) | 25 | 10.0 | 115 | 2.9 | 2.8 | 2 |
| | | 50 | 1.9 | | | | |
| Ex. 2 | " (Prep. Ex.2) | 25 | 17.0 | 162 | 0.8 | 2.6 | 2 |
| | | 50 | 4.3 | | | | |
| Ex. 3 | " (Prep. Ex.2) | 25 | 24.8 | 171 | 0.5 | | |
| Ex. 4 | Cyclohexylpolyepichlorohydrin monoglycidyl ether (Prep. Ex.4) | 25 | 20.5 | 152 | 1.4 | 2.8 | 1 |
| | | 50 | 5.5 | | | | |
| Ex. 5 | " (Prep. Ex.5) | 25 | 23.2 | 167 | 0.7 | 1.7 | 1 |
| Ex. 6 | isopropylpolyepichlorohydrin monoglycidyl ether (Prep. Ex.6) | 25 | 15.5 | 134 | 1.9 | 2.9 | 2 |
| | | 50 | 4.8 | | | | |
| Ex. 7 | Benzylpolyepichlorohydrin monoglycidylether (Prep. Ex.7) | 25 | 22.3 | 160 | 0.6 | 2.7 | 1 |
| Ex. 8 | Phenylpolyepichlorohydrin monoglycidyl ether (Prep. Ex.8) | 25 | 47.5 | 175 | 0.3 | 2.5 | 1 |
| | | 50 | 21.5 | | | | |
| Ex. 9 | " (Prep. Ex.9) | — | — | 165 | 0.4 | 2.1 | 1 |
| Ex. 10 | " (Prep. Ex.10) | 25 | 48.2 | 177 | 0.2 | 2.6 | 1 |
| Ex. 11 | p-tolylpolyepichlorohydrin monoglycidyl ether (Prep. Ex.11) | 25 | 38.0 | 148 | 0.2 | 2.7 | 1 |
| Ex. 12 | iso-amylepichlorohydrin monoglycidyl ether (Prep.Ex.12) | 25 | 15.6 | 161 | 1.3 | 2.6 | 1 |
| Ex. 13 | Allylepichlorohydrin monoglycidyl ether (Prep.Ex.13) | 25 | 16.4 | 153 | 0.9 | 2.7 | 1 |
| Comp. 1 | n-Butyl glycidyl ether | — | — | 65 | 99.3 | — | 6 |
| Comp. 2 | Phenyl glycidyl ether | — | — | 79 | 11.0 | 2.6 | 3 |
| Comp. 3 | 1,4-Butanediol diglycidyl ether | — | — | — | 2.5 | 7.6 | 10 |
| Comp. 4 | 1,6-hexanediol diglycidyl ether | — | — | — | 1.5 | 6.5 | 10 |
| Comp. 5 | Polypropylene glycol (425) diglycidyl ether | — | — | — | 0.9 | 9.7 | 7 |
| Comp. 6 | Ethylene glycol diglycidyl ether | — | — | — | 3.7 | 5.6 | 6 |
| Comp. 7 | Glycerine glycidyl ether | — | — | 152 | 0.2 | 4.1 | 9 |
| Comp. 8 | Epikote 828 alone | 0 | 121.0 | — | — | 2.5 | 1 |
| Ex. 14 | Mixture consisting of 85% of the monoglycidyl ether of Ex. 2 and 15% of n-butyl glycidyl ether | 25 | 16.2 | 119 | 13.1 | 2.5 | 2 |
| Comp. 9 | Mixture consisting of 85% of n-butyl glycidyl ether and 15% of the monoglycidyl ether of Example 2 | 35 | 7.5 | 65 | 82.2 | 3.1 | 6 |
| Comp. 10 | Mixture consisting of 50% of n-butyl glycidyl ether and 50% of the monoglycidyl ether of Example 1 | 25 | 6.5 | 68 | 35.1 | 3.0 | 4 |
| Ex. 15 | Mixture consisting of 85% of the monoglycidyl ether of Example 4 and 15% of cyclohexyl glycidyl ether | 25 | 18.5 | 124 | 7.8 | 2.7 | 1 |
| Comp. 11 | Mixture consisting of 80% of cyclohexyl glycidyl ether and 20% of the monoglycidyl ether of Example 4 | 25 | 8.8 | 72 | 37.1 | 3.0 | 4 |
| Ex. 16 | Mixture consisting of 80% of the monoglycidyl ether of Example 8 and 20% of phenyl glycidyl ether | 25 | 41.1 | 138 | 2.0 | 2.8 | 1 |
| Comp. 12 | Mixture consisting of 85% of phenyl glycidyl ether and 15% of the monoglycidyl ether of Example 8 | 25 | 9.2 | 80 | 9.1 | 3.1 | 3 |
| Comp. 13 | Octyl glycidyl ether (free from inactive chlorine) | — | — | — | — | — | — |
| Comp. 14 | Octyl glycidyl ether (containing 1.6% of inactive chlorine) | — | — | — | — | — | — |
| Comp. 15 | Octadecyl glycidyl ether | — | — | — | — | — | — |

| Examples (Ex.) & Comparative Examples (Comp.) | Maximum exothermic heat | Barcol hardness | | Pot life (minutes) | Volume resistivity ($\Omega$-cm, 120°C) | Compatibility | | | | | |
|---|---|---|---|---|---|---|---|---|---|---|---|
| | | Amount of the diluent in the composition (wt. %) | Hardness value | | | (A) Epikote 828 | | (B) Triethylene tetramine | | (C) Versamide 125 | |
| | | | | | | I | II | I | II | I | II |
| Ex. 1 | 150 | 25 | 83 | 60 | $1.2 \times 10^{13}$ | 1 | 1 | 1 | 1 | 1 | 2 |
| | | 50 | 34 | | | | | | | | |
| Ex. 2 | 148 | 25 | 81 | 58 | $3.0 \times 10^{13}$ | 1 | 1 | 1 | 1 | 1 | 1 |
| | | 50 | 48 | | | | | | | | |
| Ex. 3 | | 25 | 65 | | | 1 | 1 | 1 | 1 | 1 | 1 |
| Ex. 4 | 149 | 25 | 83 | 59 | $2.5 \times 10^{13}$ | 1 | 1 | 1 | 1 | 1 | 1 |
| | | 50 | 66 | | | | | | | | |
| Ex. 5 | 145 | 25 | 72 | 71 | $2.1 \times 10^{13}$ | 1 | 1 | 1 | 1 | 1 | 1 |
| Ex. 6 | 161 | 25 | 70 | 64 | — | 1 | 1 | 1 | 1 | 1 | 2 |
| Ex. 7 | 148 | 25 | 76 | 63 | $5.9 \times 10^{13}$ | 1 | 1 | 1 | 1 | 1 | 1 |
| Ex. 8 | 146 | 25 | 75 | 55 | $6.9 \times 10^{13}$ | 1 | 1 | 1 | 1 | 1 | 1 |
| | | 50 | 83 | | | | | | | | |
| Ex. 9 | — | — | — | — | — | 1 | 1 | 1 | 1 | 1 | 1 |
| Ex. 10 | — | — | — | — | — | 1 | 1 | 1 | 1 | 1 | 1 |
| Ex. 11 | — | 25 | 82 | — | — | 1 | 1 | 1 | 1 | 1 | 2 |
| Ex. 12 | 151 | 25 | 79 | 62 | $3.3 \times 10^{13}$ | 1 | 2 | 1 | 2 | 1 | 2 |
| Ex. 13 | 157 | 25 | 82 | 57 | | 1 | 1 | 1 | 1 | 1 | 1 |

Table 2-continued

| Examples (Ex.) & Comparative Examples (Comp.) | Maximum exothermic heat | Barcol hardness Amount of the diluent in the composition (wt. %) | Hardness value | Pot life (minutes) | Volume resistivity ($\Omega^{-cm}$, 120°C) | Compatibility (A) Epikote 828 I | II | (B) Triethylene tetramine I | II | (C) Versamide 125 I | II |
|---|---|---|---|---|---|---|---|---|---|---|---|
| Comp. 1 | 169 | 25 | 82 | 38 | $2.1 \times 10^{12}$ | 1 | 5* | 1 | 2 | 1 | 1 |
| Comp. 2 | 167 | 25 | 86 | 40 | $2.3 \times 10^{13}$ | | | | | | |
| Comp. 3 | 173 | 25 | 79 | 36 | $6.9 \times 10^{11}$ | | | | | | |
| Comp. 4 | 157 | 25 | 76 | 65 | $2.5 \times 10^{11}$ | 1 | 1 | 1 | 2 | 7 | 7 |
| Comp. 5 | 149 | 25 | 72 | 72 | $7.7 \times 10^{11}$ | 1 | 1 | 4 | 5 | 7 | 7 |
| Comp. 6 | — | | — | — | $5.8 \times 10^{11}$ | 1 | 1 | 2 | 3 | 7 | 7 |
| Comp. 7 | — | 25 | 81 | 30 | $1.8 \times 10^{13}$ | 1 | 1 | 1 | 1 | 7 | 7 |
| Comp. 8 | 172 | | 88 | 35 | $5.5 \times 10^{14}$ | | | | | | |
| Ex. 14 | 150 | | 83 | 54 | $2.6 \times 10^{13}$ | | | | | | |
| Comp. 9 | 162 | | 85 | 43 | $4.6 \times 10^{12}$ | | | | | | |
| Comp. 10 | 154 | | 81 | 48 | $8.3 \times 10^{12}$ | | | | | | |
| Ex. 15 | 141 | | 84 | 56 | $9.8 \times 10^{12}$ | | | | | | |
| Comp. 11 | 163 | | 88 | 41 | $3.5 \times 10^{12}$ | | | | | | |
| Ex. 16 | 148 | | 82 | 52 | $4.7 \times 10^{13}$ | | | | | | |
| Comp. 12 | 170 | | 88 | 41 | $8.4 \times 10^{12}$ | | | | | | |
| Comp. 13 | — | — | — | — | — | 2 | 3 | 2 | 4 | 4 | 5 |
| Comp. 14 | — | — | — | — | — | 2 | 3 | 2 | 4 | 4 | 5 |
| Comp. 15 | — | — | — | — | — | 5 | 7 | 4 | 6 | 4 | 6 |

*Crystals precipitated

What we claim is:

1. A curable epoxy resin composition comprising an epoxy resin having at least two epoxy groups selected from glycidyl and methylglycidyl in the molecule and a reactive diluent, at least 60% by weight of the total amount of said reactive diluent consisting of a compound expressed by the following formula (I)

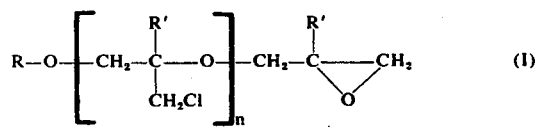

wherein R is a member selected from the group consisting of straight-chain alkyl containing 1 to 7 carbon atoms, branched-chain alkyl containing 1 to 7 carbon atoms, alkenyl containing 2 to 7 carbon atoms, cycloalkyl containing 5 to 6 carbon atoms, methyl-substituted cycloalkyl containing 6 to 7 carbon atoms, phenyl cresyl and benzyl R' is a hydrogen atom or methyl, a plurality of R' groups may be the same or different, and n is a positive integer of 1 to 9.

2. The epoxy resin composition of claim 1 wherein the amount of said reactive diluent is 1 to 150 parts by weight per 100 parts by weight of said epoxy resin.

3. The epoxy resin composition of claim 1 wherein said epoxy resin is a bisphenol A. glycidyl ether type epoxy resin derived from bisphenol A and epichlorohydrin.

4. The curable epoxy resin composition of claim 1 wherein at lease 80% by weight of the total amount of said reactive diluent consists of the compound expressed by formula (I).

5. The curable epoxy resin composition of claim 1 wherein said epoxy resin is selected from the group consisting of: Bisphenol A.glycidyl ether epoxy resins; phenol novolac polyglycidyl ether epoxy resins; cresol novolac polyglycidyl ether epoxy resins; brominated bisphenol A.diglycidyl ether epoxy resins; hydrogenated bisphenol A.diglycidyl ether epoxy resins; diglycidyl ether epoxy resins derived from alkylene oxide-added bisphenol A and epichlorohydrin and containing an alkylene ether in the side chain; resorcinol.diglycidyl ether epoxy resins; phthalic acid diglycidyl ester epoxy resins; and bisphenol A.methylepichlorohydrin epoxy resins.

* * * * *